United States Patent Office 3,075,907
Patented Jan. 29, 1963

3,075,907
PHOTOPOLYMERIZATION OF MONOMERS CONTAINING VINYL GROUPS BY MEANS OF SILVER COMPOUNDS AS CATALYSTS
Steven Levinos, Vestal, N.Y., assignor to General Aniline & Film Corporation, New York, N.Y., a corporation of Delaware
No Drawing. Filed Feb. 17, 1958, Ser. No. 715,528
11 Claims. (Cl. 204—158)

The present invention relates to the formation of solid polymers by photopolymerization of normally liquid or solid monomeric vinyl compounds while employing a radiation-sensitive, non-oxidizing silver compound as the catalyst or promoter of the reaction.

The polymerization of vinyl compounds is a phenomenon well recognized in the art. Extensive work has been done in the manufacture and exploitation of polyvinyl compounds and the literature is rife with procedures leading to the preparation of such polymers ranging from viscous liquids to hard brittle or elastic solids.

Generally, monomeric vinyl compounds are polymerized or copolymerized by subjecting the monomer(s) in solution or in a dispersion to the action of elevated temperatures in the presence of oxygen or a peroxide catalyst such as benzoyl peroxide, hydrogen peroxide and the like. For instance, British Patent 304,681 of 1928 refers to the polymerization of acrylic acid by heat in the presence of oxygen or organic peroxides while using a solvent such as acetone. Copolymers of mixtures of vinyl compounds such as ethyl acrylate with vinyl acetate or with styrene are prepared in a similar fashion.

It is recognized that certain of the monomeric vinyl compounds are sensitive to UV light and may be polymerized by irradiation with UV or a source thereof such as sunlight in the presence or absence of a catalyst. Thus, Ellis in "The Chemistry of Synthetic Resins" (volume II) (1935) states at the bottom of page 1072 that methyl acrylate, on long standing in the sunlight, changed into a transparent, odorless mass of density 1.222. At the bottom of page 1070, the same writer indicates that acrylic acid polymerizes under the influence of light or heat in the presence of a catalyst. On page 1071, however, it is noted that photopolymerization of acrylic acid is inhibited by the presence of oxygen. It is to be emphasized, however, that such procedures involving the use of light to effect polymerization proceed at a very low rate and/or with the formation of relatively low molecular weight polymers. Typically, an aqueous solution of acrylamide containing N,N′-methylene-bis-acrylamide will polymerize upon exposure to sunlight for one hour. The polymer formed, however, is not a hard mass. On the other hand, acrylamide plus the same cross-linking agent will not polymerize when exposed for 90 minutes to the light of a 150 watt tungsten light source at a distance of 12″.

In recognition of the sensitivity of certain vinyl compounds to UV radiation, suggestions have been made that polymers of such monomers be prepared either in bulk or imagewise by subjecting the monomers to the action of UV radiation in the presence of a promoter for the reaction. Thus, Jones in U.S.P. 2,533,166 polymerized acrylamide and certain derivatives thereof such as N-ethanol acrylamide and N-ethanol methacrylamide by UV irradiation in the presence of organic solvents. It is claimed that the products produced are soluble in water and are compatible with gelatino silver halide emulsions, as a consequence of which they may be used as gelatin substitutes in such emulsions.

Gerhart in U.S.P. 2,673,151 disclosed photographic reproduction by subjecting to the action of light a copolymerizable mixture of (A) polyesters of alpha-beta ethylenic, alpha-beta dicarboxylic acids and (B) ethylenically unsaturated compounds copolymerized therewith, said composition being sensitized by the addition of sulfur compounds. It is suggested that in such reproduction an appropriate body of the liquid, copolymerizable mixture containing the sulfur sensitizer and usually containing a copolymerization catalyst such as a peroxide is exposed by contact or by projection to the desired image. Preferably, exposure is prolonged under the action of light at least until partial polymerization, i.e., a gel stage, is reached. If desired, the light may then be removed and the final cure effected by heating the mixture until final cure is attained. The light source used was sunlight or light from a carbon arc, i.e., UV, light.

Murray in U.S.P. 2,475,980 suggests the photopolymerization of addition products of piperic acid and piperidine in the presence of an accelerator such as benzoyl peroxide. Murray prefers to initiate polymerization by exposure to sunlight and to harden the relatively soft resin thus obtained by a brief heat treatment.

Oster in "Photographic Engineering," volumes 3–4, 1952–53, discloses on page 177 photopolymerization with visible light of vinyl monomers in the presence of a reducible dye such as Rose Bengal and a mild reducing agent. It is indicated by Oster that his system, one of the few suggested for photopolymerization by visible light, may be used for the imagewise formation of polymers, i.e., in the production of printing plates. He emphasizes that his method must be effected in the presence of atmospheric oxygen.

None of the prior art systems, however, constitutes a simple convenient method of directly forming high molecular weight solid polymers in a relatively short period of time and without resort to elevated temperatures. Thus, the products of Jones are of low molecular weight. The polymers of Gerhart produced by use of light are in the same category and, in this connection, it is noted that Gerhart's exposure is prolonged until partial polymerization to the gel stage is reached. The final cure is not affected by light but by heat. In this respect, Murray's process is similar. Oster's system is complicated in its resort to the use of a reducible dye and a reducing agent in the presence of atmospheric oxygen.

I have now discovered that monomeric vinyl compounds which are normally liquid or solid, i.e., liquid or solid at room temperature, may be directly photopolymerized in essentially short periods of time to high molecular weight solids by subjecting a solution or dispersion of the monomer or mixtures thereof in the presence of water to the action of radiations ranging in wave length from $10^{-1}$ to $10^{-10}$ cm. and preferably to visible light while using a radiation-sensitive, non-oxidizing silver compound as the catalyst or promoter.

The particular mechanism by which I achieve photopolymerization has not been ascertained and is not self-evident. It is quite possible that the photopolymerization is due to the presence of free radicals produced during the decomposition of the radiation-sensitive silver compound. A free radical, it may be noted, is a compound with an unpaired electron, usually a fragment of a larger molecule which has been split by heating. The mechanism involving free radicals is explained, for instance, on page 98 et seq., "Scientific American," September 1957. Regardless of the theory involved, the fact remains that said radiation-sensitive silver compounds have the very unusual ability under the action of radiation ranging in wave length from $10^{-1}$ to $10^{-10}$ cm. of initiating and continuing the polymerization of monomeric vinyl compounds to high molecular weight solids. Most important is the fact that this system, unlike practically all prior systems, is also effective when using visible rather than UV radiation.

The direct formation of solid polymers by the irradiation, with rays of the aforesaid wave length, of monomers containing vinyl groups in the presence of water and a radiation-sensitive, non-oxidizing silver compound as the catalyst constitutes the purposes and objects of my invention.

It has been ascertained that the characteristics of the radiation-sensitive, non-oxidizing silver compounds to initiate photopolymerization of vinyl monomers is generic to such a class and is not restricted to a few members thereof. Silver compounds which are active oxidizing agents such as, for example, silver perchlorate, are excluded since these react explosively with vinyl compounds even in the dark and cause the vinyl compound to undergo change through oxidation rather than polymerization. Similarly, silver compounds which decompose when stored in darkness are not contemplated for use.

Examples of silver compounds possessing the property of catalyzing photopolymerization are: silver acetate, silver acetylide, silver ortho-arsenate, silver ortho-arsenite, silver benzoate, silver tetraborate, silver bromate, silver bromide, silver carbonate, silver chloride, silver chromate, silver citrate, silver ferrocyanide, silver fluoride, silver iodide, silver lactate, silver fluosilicate, silver cyanide, silver thiocyanate, silver laurate, silver levulinate, silver phenol-sulfonate, silver ortho-phosphate, silver myristate, silver nitrate, silver nitrite, silver picrate, silver nitro-prusside, silver selenate, silver selenide, silver potassium cyanide, silver oxalate, silver oxide, silver ammonium hydroxide (ammoniacal silver oxide), silver palmitate, silver propionate, silver salicylate, silver sulfide, silver acridine, silver hyponitrite, silver azide, silver tellurate, silver sulfite, silver thionate, silver sulfamate, silver stearate, silver sulfate, silver tartrate, silver thiosulfate, silver tungstate, silver molybdate, silver iridate, silver formate, silver malonate, silver succinate, silver glutarate, silver adipate, silver albuminates, silver caseinates, addition componuds of benzidine and silver nitrate, addition compounds of silver nitrate and quinoline, silver vanadate, or the silver salts of U.S.P. 2,193,574 such as the silver salt of p-nitrooxanilic acid, the silver salt of 6,6'-dinitro-ortho-tolidine, dioxamic acid, the silver salt of benzene sulfinic acid, the silver salts of U.S.P. 2,066,582, silver salts of the amino acids such as those described in U.S.P. 2,164,687 and U.S.P. 2,454,011, i.e., silver lysalbinate, silver gelatose, etc.

This list of suitable silver compounds is indicative of the fact that the ability of a radiation-sensitive, non-oxidizing silver compound to catalyze photopolymerization is the rule rather than the exception. It also serves to establish that the solubility of the silver compound, i.e., whether water or organic solvent soluble, is not a criterion of the adaptability of the silver compound for the intended use.

Only catalytic amounts of the silver compound are needed for photopolymerization. This means that the silver compound will be employed in an amount which is exceedingly small when measured against the quantity of the monomer. I have effectively used a silver compound in an amount by weight as low as $1/70,000$ of the weight of the monomer. Greater amounts of the catalyst by weight may be employed but will generally be found to be unnecessary. For example, I have obtained excellent results with amounts of salt ranging up to 10%.

Any normally liquid to solid monomeric vinyl compound or mixtures thereof may be photopolymerized by irradiation in the presence of the non-oxidizing silver compounds. Suitable monomers are, for example, acrylamide, acrylonitrile, N-ethanol acrylamide, methacrylic acid, acrylic acid, calcium acrylate, methacrylamide, vinyl acetate, methylmethacrylate, methylacrylate, ethylacrylate, vinyl benzoate, vinyl pyrrolidone, vinylmethyl ether, vinylbutyl ether, vinylisopropyl ether, vinylisobutyl ether, vinylbutyrate, butadiene or mixtures of ethylacrylate with vinyl acetate, acrylonitrile with styrene, butadiene with acrylonitrile and the like.

It is recognized that the molecular weight and hence the ultimate hardness of a vinyl polymer can be increased by utilization during polymerization of a small amount of an unsaturated compound containing at least two terminal vinyl groups each linked to a carbon atom in a straight chain or in a ring. These compounds serve to cross-link the polyvinyl chains and are generally designated as cross-linking agents. Such agents are described, for example, by Kropa and Bradley in vol. 31, No. 12, of "Industrial and Engineering Chemistry," 1939. Among such cross-linking agents for my purpose may be mentioned N,N'-methylene-bis-acrylamide, triallyl cyanurate, divinyl benzene, divinyl ketones and diglycol-diacrylate.

The cross-linking agent is generally employed in an amount ranging from 10 to 50 parts of monomer to each part of the cross-linking agent. It is understood that the greater the quantity of cross-linking agent within such range, the harder the polymer obtained.

The photopolymerization hereof, depending upon the solubility of the monomer on the one hand and the silver compound on the other, will be carried out in a solvent solution of the involved compounds or in an aqueous dispersion of such components. Typically, if the monomer and silver compound are both water soluble, such as, for example, acrylamide, acrylic acid or the like, and silver nitrate, silver citrate or the like, the monomer and silver salt may be dissolved in a quantity of water sufficient to provide solution and the polymerization brought about by irradiation. If, however, the monomer and silver salt are soluble in the same organic solvent or in different organic solvents which are, however, miscible with each other, the reaction mixture may be produced by use of such solvents or mixed solvents. For example, methylmethacrylate and silver laurate are both soluble in alcohol and hence resort may be had to this solvent for preparing the reaction mixture. In lieu of alcohol, use may also be made of such normally liquid organic solvents (i.e., liquid at room temperature) as toluene, acetone, methanol, butylacetate, ethylmethylketone, benzyl alcohol and the like.

It is understood, however, that where an organic solvent system is employed, provision must be made for the presence in the system of a small quantity of water, say, about .1 to 5% by weight. The water may be added as such or may be supplied by incorporating in the reaction mixture a humectant such as ethylene glycol, glycerine or the like. When these substances are present, say in an amount of a few percent by weight of the mixture, they absorb sufficient water from the atmosphere to permit photopolymerization to proceed.

Dispersions may also be used in effecting the photopolymerization as previously indicated. These may be formed by dispersing a water insoluble monomer in water by means of a dispersing agent and dispersing the silver compound in the resulting suspension or dispersion. Suitable dispersing agents are, for example, long chain fatty acid sarcosides or taurides, i.e., oleyl-N-methyl taurine, stearyl sarcosine; keryl benzene sulfonate (made by reacting chlorinated kerosene with benzene and sulfonating the resulting product); the reaction product of from 12 to 20 mols of ethylene oxide with a phenol such as dibutyl phenol, a fatty alcohol, i.e., lauryl alcohol, an amine, i.e., rosin amine or a fatty acid, i.e., stearic acid; dioctyl sulfo succinate; fatty alcohol sulfonates, i.e., α-hydroxyoctodecane sulfonic acid, lauryl sulfonate or the like. Dispersions may also be made by dissolving a resin such as ethyl cellulose in toluene and dispersing an aqueous solution or mixture of the monomer and silver compound in the resulting oil.

The pH of the reaction mixture may have a bearing on the rate at which polymerization is initiated. I find that the mixture should not be either too highly acid or too highly alkaline. Preferably I operate at or near the neutral point of the reaction mixture.

The reaction is carried out in any of the usual reactors while irradiating the walls thereof with UV, visible light, X-rays or gamma rays. If UV or visible light radiation is employed, the walls of the reactors should be of glass or similar material transparent to these rays. If X- or gamma-radiation is employed, the walls may be of any material permeable thereto such as glass, steel, aluminum or the like.

The UV radiation may be derived from a carbon arc lamp or a high intensity mercury vapor lamp. Visible radiation may be supplied by photoflash lamps or a tungsten filament lamp. An X-ray machine of the conventional type may be used as a source for such rays, whereas Cobalt 60 may be utilized to supply gamma radiation. The source of the rays employed is generally located a short distance, say 6 to 12", from the walls of the reactor.

The photopolymerization may be carried out in bulk form or continuously by feeding in monomer and silver compound to the reactor and withdrawing the polymer as formed. For a continuous operation, use may be made of the apparatus described in U.S.P. 2,122,805 granted July 5, 1938.

My process may be used not only to form polymers in a bulk but also to form polymers imagewise if desired. For example, a relief printing plate may be made by dispersing the silver compound in a water soluble monomer, coating the dispersion on a base such as metal, film or the like, and exposing the coating to visible light under a pattern. Where the coating is exposed, a hydrophobic polymer is formed. The plate is then developed by washing off the monomer to produce a negative working relief plate. By using a hydrophilic surface as a support for the coating, i.e., partially saponified cellulose acetate, a plate is produced having greasy, ink-receptive and water-receptive areas. Such plate may be used as a negative working offset plate. These are but a few illustrations of the many commercial adaptations to which my invention may be put.

The following examples will serve to illustrate my invention, although it is to be understood that the invention is not restricted thereto.

*Example I*

A composition was prepared from the following components:

| | Parts |
|---|---|
| Acrylamide | 180 |
| N,N'-methylene-bis-acrylamide | 7 |
| Water | 120 |

To 5 cc. of this composition there was added 1 cc. of a 5% aqueous solution of silver nitrate. By irradiating this composition to the light of a 500 watt tungsten lamp at a distance of approximately 12", the photopolymerization was complete after 10 minutes exposure, with the formation of a solid polymeric mass.

*Example II*

The procedure was the same as in Example I excepting that the composition was irradiated with UV light. In this procedure, polymerization was complete after a few minutes. The polymer obtained was similar to that of Example I.

*Example III*

180 parts of acrylamide were dissolved in 120 parts of water and to 5 cc. of this solution there were added 2 cc. of a 10% aqueous solution of silver nitrate. Exposure to sunlight for 10 minutes resulted in the formation of a solid polymeric mass.

*Example IV*

180 parts of acrylamide and 7 parts of N,N'-methylene-bis-acrylamide were dissolved in 120 parts of water. 2 cc. of this solution and .1 cc. of an aqueous solution containing .017 g. of silver nitrate were added to a Pyrex tube. The solution was irradiated by a photoflood lamp (3400° K.) operated at 110 volts at a distance of 12" from the Pyrex tube. Filters were employed to remove infra-red and UV radiation.

Polymerization was found to occur in five minutes with the formation of a hard solid polymer.

*Example V*

The procedure was the same as in Example IV excepting that there was used .5 cc. of an aqueous solution containing .085 g. of silver nitrate. Polymerization in this case occurred in 2.5 minutes.

It was ascertained that a further increase in the amount of silver nitrate did not result in increasing the rate of polymerization.

*Example VI*

10 cc. of the following solution were shaken with approximately 50 mg. of silver oxide for five minutes:

| | Parts |
|---|---|
| Acrylamide (recrystallized) | 180 |
| N,N'-methylene-bis-acrylamide | 7 |
| Water | 120 |

The clear liquid was decanted and a sample exposed in a glass reactor to the light of a 150 watt tungsten lamp at a distance of 6". Polymerization was initiated after an exposure of 11 minutes.

The solubility of silver oxide in water being known, the concentration of silver compound necessary to initiate photopolymerization in this case can be calculated as follows:

Solubility of $Ag_2O$ in water=0.0022 g./100 cc. water (at 20° C.)=0.22 mg./10 cc. of water.

From the ratio of acrylamide to water in the above composition (3 to 2), it follows that 15 grams of acrylamide are mixed with 10 cc. of water, or 0.22 mg. of $Ag_2O$ are required to polymerize 15 grams or 15,000 mg. of acrylamide. Thus, the ratio of silver oxide to acrylamide is 0.22:15,000 or 1 to 67,500. In other words, an amazingly small amount of silver compound is effective in catalyzing the photopolymerization of the monomer.

*Example VII*

10 cc. of the monomer-cross-linking agent mixture of Example VI were shaken with 100 mg. of silver benzoate. The mixture was irradiated as in Example VI and polymerization was found to be initiated after exposure time of only 15 minutes.

*Example VIII*

Approximately 100 mg. of silver sulfamate were shaken with 10 cc. of the monomer-cross-linking agent composition of Example VI. Irradiation of the composition as in Example VI resulted in initiation of polymerization in about 12 minutes.

*Example IX*

100 mg. of silver sulfate were mixed with 10 cc. of the monomer-cross-linking agent composition of Example VI. Irradiation as in Example VI resulted in initiation of polymerization in about 13 minutes.

*Example X*

100 mg. of silver acetate were mixed with 10 cc. of the monomer-cross-linking agent composition of Example VI. Irradiation as in Example VI resulted in initiation of polymerization in about 15 minutes.

*Example XI*

50 cc. of an aqueous solution containing 1.7 g. of silver nitrate were added to 200 cc. of an aqueous solution containing 2.8 g. of 4-sulfo-phenyl-3-carboxylic acid-5- pyrazolone. .2 cc. of the resulting solution was added to 3 cc. of the following composition:

| | Parts |
|---|---|
| Acrylamide | 180 |
| N,N'-methylene-bis-acrylamide | 7 |
| Water | 120 |

The solution was irradiated with a 500 watt lamp at a distance of 9" from the reactor. After five minutes exposure, a brown, water insoluble polymer was formed.

*Example XII*

10 cc. of the following mixture at 40° C. were shaken with 50 mg. of silver oxide:

| | Parts |
|---|---|
| Methacrylamide | 50 |
| N,N-methylene-bis-acrylamide | 4 |
| Water | 70 |

The clear liquid was irradiated with a 150 watt tungsten lamp at a distance of 6". The mass polymerized after an exposure of 20 minutes. The temperature of 40° C. was not utilized to supply heat for the polymerization but merely to ensure that the components would remain in solution.

*Example XIII*

The process was the same as in Example VI excepting that an equivalent amount of silver benzene sulfinate was used in lieu of the silver oxide catalyst. The monomer when irradiated with a 500 watt lamp at a distance of 7" polymerized in 50 to 60 seconds.

*Example XIV*

The composition as defined in Example XII was coated on a support such as metal, i.e., aluminum or partially saponified cellulose acetate, and dried. The coating was then exposed to UV light under a pattern, resulting in the formation of a hard polymer where the coating was light-struck. The unpolymerized portions were then washed out with a suitable solvent such as water. Depending upon the particular support for the coating, the product obtained was a relief plate (aluminum support) or an offset plate (saponified cellulose acetate).

*Example XV*

To 10 cc. of the following solution:

| | Parts |
|---|---|
| Acrylamide | 180 |
| Water | 120 | was added 1 cc. of a 10% aqueous solution of sodium sulfide and 1 drop of a 10% aqueous solution of silver nitrate. The container (test tube) was exposed to a 150 watt tungsten lamp at a distance of approximately 12". Polymerization of the mixture started in about five minutes. At the end of 10 minutes, the tube was hot and the entire mass had polymerized to a rubber-like polymer. Its color was brown or amber due to silver sulfide.

Various modifications of the invention will occur to persons skilled in the art. I, therefore, do not intend to be limited in the patent granted except as necessitated by the appended claims.

I claim:

1. The process for photopolymerizing normally liquid to normally solid vinyl monomers which comprises irradiating such monomers in the presence of water with radiations of a wave length ranging from $10^{-1}$ to $10^{-10}$ cm. while utilizing catalyst amounts of a catalyst consisting essentially of a radiation-sensitive, silver salt.

2. The process as defined in claim 1 wherein photopolymerization is effected by radiation with visible light.

3. The process as defined in claim 1 wherein the vinyl monomer and silver salt are water soluble and the photopolymerization is effected in an aqueous solution of the monomer and silver salt.

4. The process as defined in claim 1 wherein the monomer is water insoluble and the photopolymerization is effected in an aqueous dispersion of the monomer and silver salt.

5. The process as defined in claim 1 wherein the monomer and silver salt are soluble in an organic solvent inert to the reactants and the photopolymerization is effected in an organic solvent solution of the monomer and silver salt in the presence of a small amount of water.

6. The process as defined in claim 1 wherein the silver salt is a salt of silver and an inorganic acid.

7. The process as defined in claim 1 wherein the silver salt is a silver salt of an organic acid.

8. The process as defined in claim 1 wherein the reaction mixture contains an organic compound containing at least two terminal vinyl groups as a cross-linking agent.

9. The process as defined in claim 8 wherein the cross-linking agent is selected from the class consisting of N,N'-methylene-bis-acrylamide, triallyl cyanurate, divinyl benzene, divinyl ketones and diglycol-diacrylate.

10. The process as defined in claim 8 wherein 1 part of the cross-linking agent is employed for each 10 to 50 parts of monomer.

11. The process for photopolymerizing normally liquid to normally solid vinyl monomers which comprises irradiating with visible light such monomers in the presence of water and a cross-linking agent selected from the class consisting of N,N'-methylene-bis-acrylamide, triallyl cyanurate, divinyl benzene, divinyl ketones and diglycol-diacrylate while utilizing catalytic amounts of a catalyst consisting essentially of a silver salt of an inorganic acid.

References Cited in the file of this patent

UNITED STATES PATENTS

| 1,241,738 | Klatte et al. | Oct. 2, 1917 |
| 2,118,864 | Reppe et al. | May 31, 1938 |
| 2,419,009 | Coffman et al. | Apr. 15, 1947 |
| 2,661,331 | Howard | Dec. 1, 1953 |
| 2,875,047 | Oster | Feb. 24, 1959 |
| 3,038,800 | Luckey et al. | June 12, 1962 |